Oct. 8, 1940.   M. A. WECKERLY   2,217,243
WEIGHING SCALE
Filed Nov. 12, 1937   4 Sheets-Sheet 1
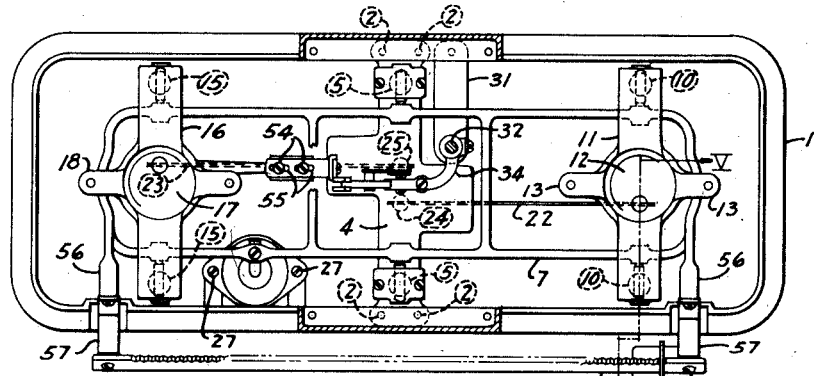
Fig. II
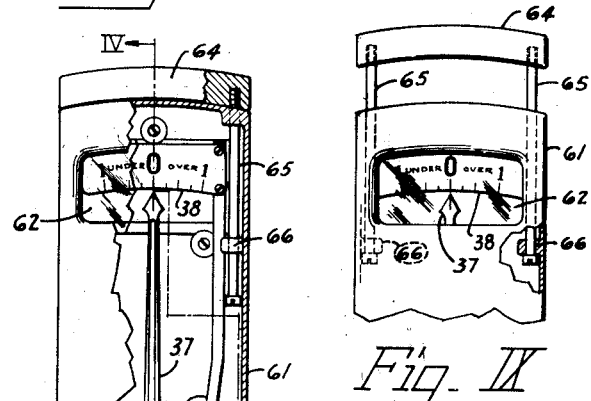
Fig. IX
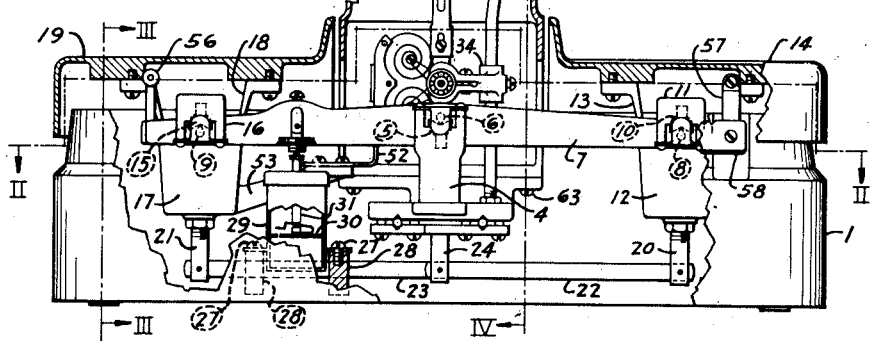
Fig. I
Mark A. Weckerly
INVENTOR
BY Marshall & Marshall
ATTORNEYS Oct. 8, 1940.                M. A. WECKERLY                2,217,243
                              WEIGHING SCALE
                           Filed Nov. 12, 1937        4 Sheets-Sheet 2
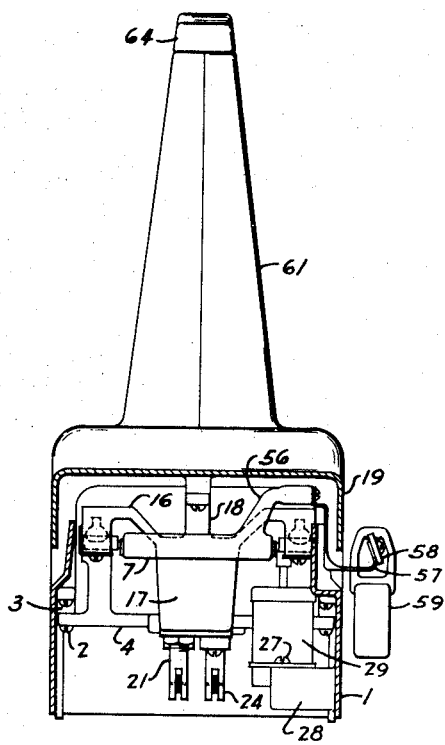
Fig. III
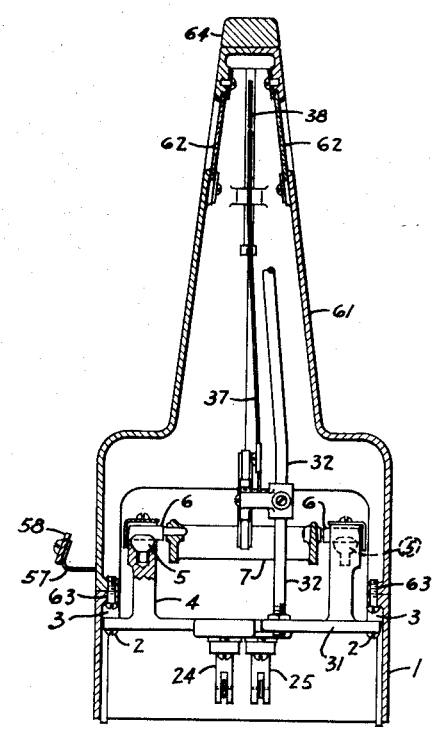
Fig. IV
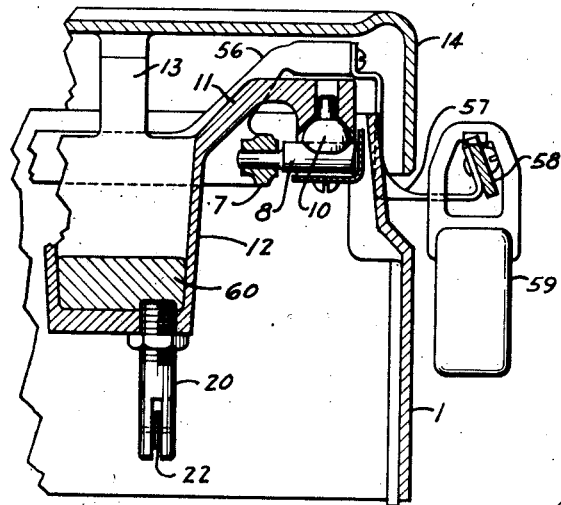
Fig. V
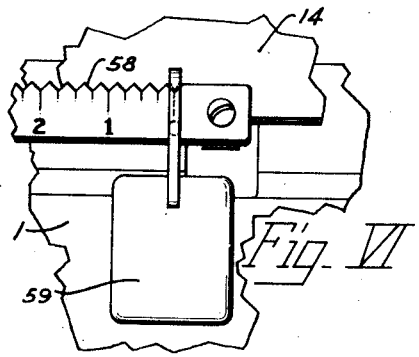
Fig. VI
Mark A. Weckerly
INVENTOR
BY Marshall & Marshall
ATTORNEYS

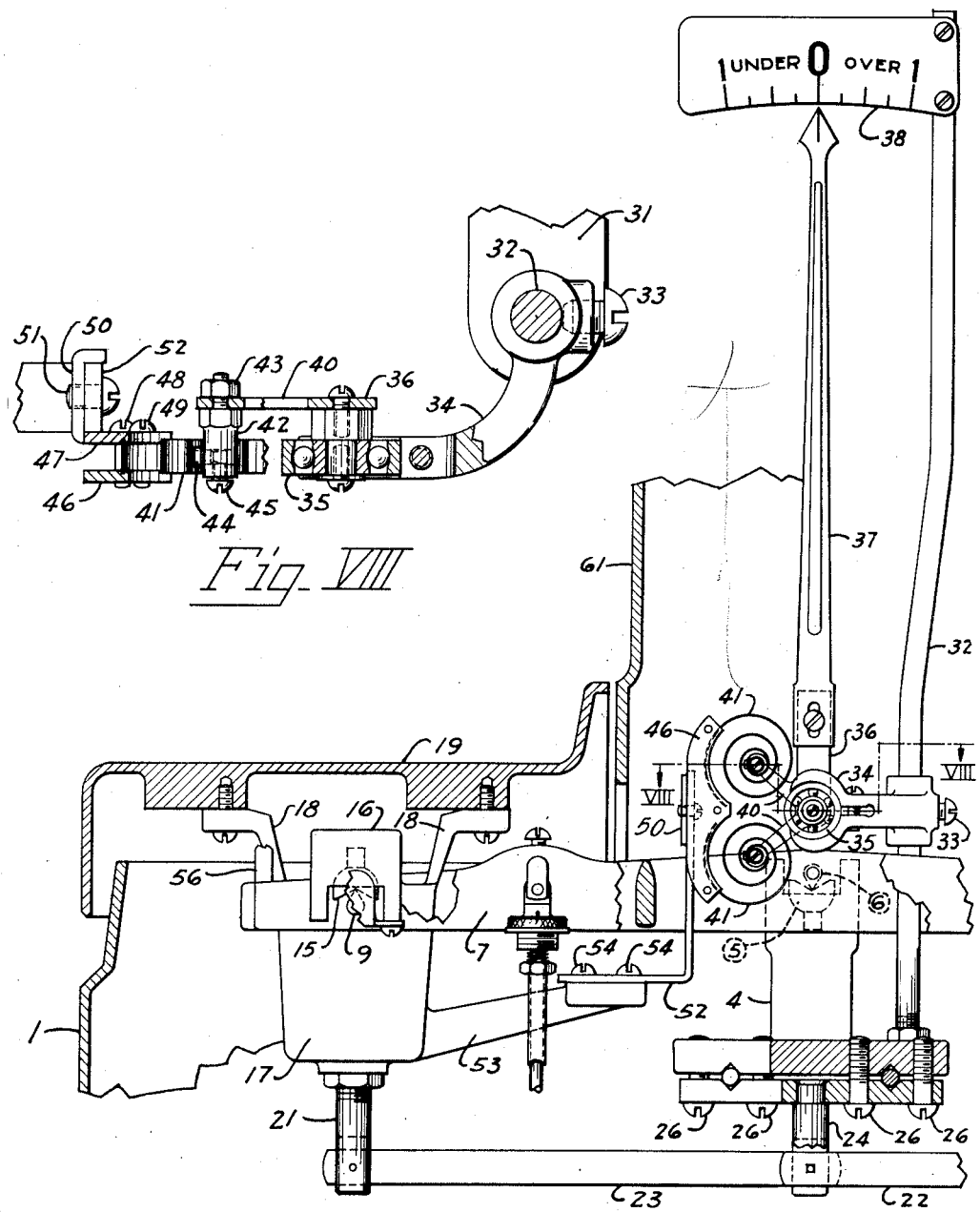

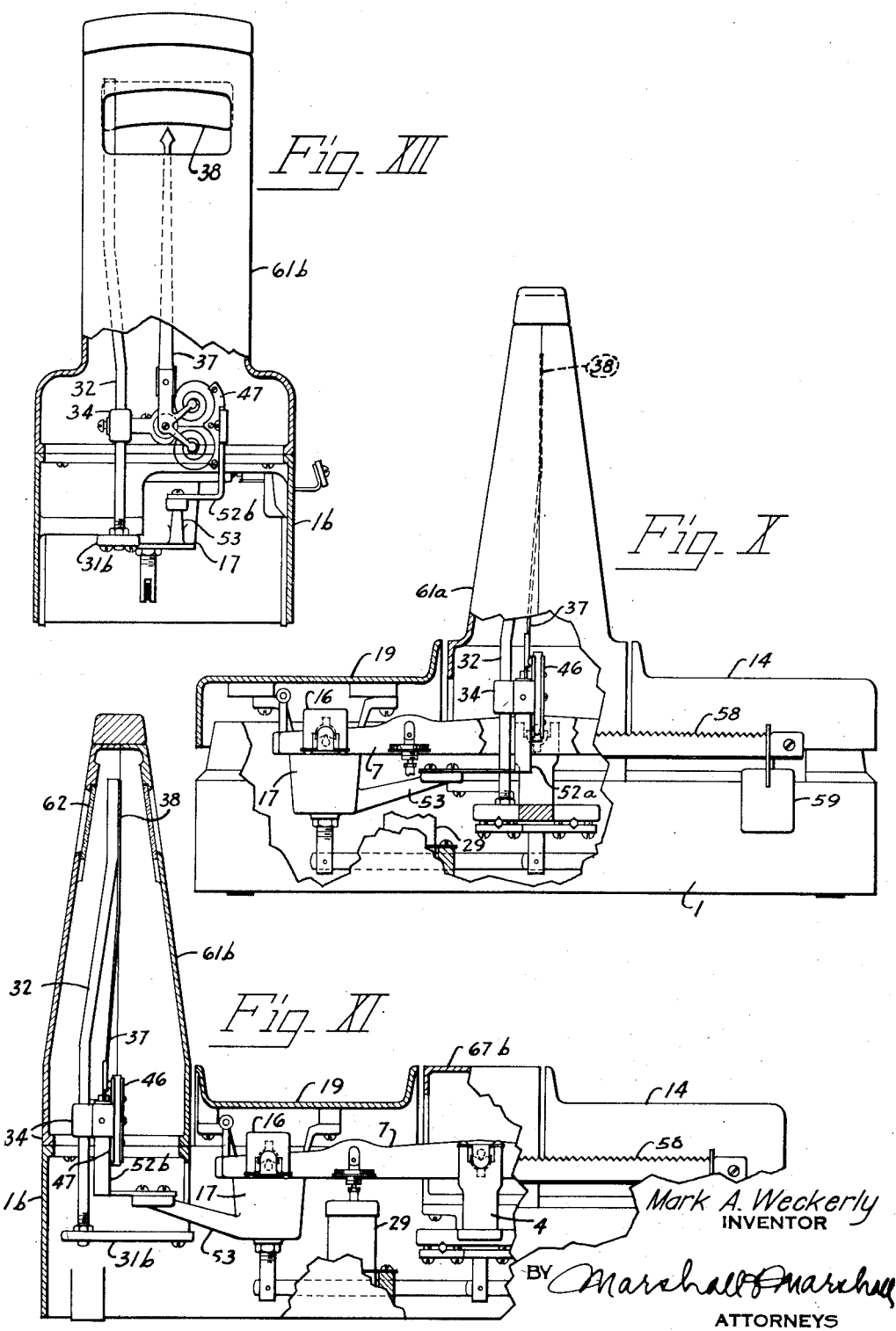

Patented Oct. 8, 1940

2,217,243

UNITED STATES PATENT OFFICE 2,217,243

WEIGHING SCALE

Mark A. Weckerly, Toledo, Ohio, assignor to Toledo Scale Company, a corporation of New Jersey Application November 12, 1937, Serial No. 174,271

6 Claims. (Cl. 265—58)

This invention relates to weighing scales of the predetermined weight type. One of its principal objects is to provide a predetermined weight scale having mechanism which may be utilized either with the indicator at the center of the scale or with the indicator at the end of the scale.

Another object is to provide a predetermined weight scale having mechanism which can be utilized with the indicator facing either toward the sides or toward the ends of the scale.

Another object is to provide a scale of the predetermined weight type having small overall height, but in which the indicator is moved through a comparatively great distance by a comparatively slight movement of the load-receiver.

Another object is to provide a scale of this type in which the mechanism is completely enclosed but is readily accessible.

Another object is to provide improved means for adjusting the sensibility of the scale.

And still another object is to provide means for connecting a beam on the exterior to mechanism on the interior of the scale housing without a direct opening therethrough.

Other objects and advantages will be apparent from the following description, in which reference is had to the accompanying drawings illustrating a preferred embodiment of my invention and wherein similar reference numerals designate similar parts throughout the several views.

In the drawings—

Figure I is a side elevational view of a predetermined weight scale embodying my invention, parts being broken away and parts being shown in section;

Figure II is a top plan view of the base mechanism of the scale, the load and counterpoise platters being removed, and the housing, pointer and chart support being shown in section on the line II—II of Figure I;

Figure III is an end elevational view of the scale, the counterpoise platter and base shell being shown in section along the line III—III of Figure I;

Figure IV is a view in section taken along the line IV—IV of Figure I;

Figure V is an enlarged fragmentary view in section along the line V—V of Figure II;

Figure VI is a similarly enlarged fragmentary view showing a poise and part of a graduated beam employed in the scale;

Figure VII is an enlarged fragmentary view with parts in section, showing the connection of the indicator to the counterpoise receiver;

Figure VIII is a further enlarged fragmentary view taken in section along the line VIII—VIII of Figure VII;

Figure IX is a fragmentary elevational view showing a handle for moving the scale;

Figure X is a side elevational view of the scale of my invention arranged with the indicator at the center of the scale and facing toward the end instead of toward the side, parts being broken away and parts being shown in section;

Figure XI is a side elevational view showing the scale of my invention with the indicator located at the end of the scale and facing toward the end instead of toward the side, parts being broken away and parts being shown in section; and Figure XII is an end elevational view of the scale arranged as in Figure XI, parts being broken away and parts being shown in section.

Referring first to the arrangement shown in Figures I to IX inclusive, the base or principal frame of the scale is a rectangular shell 1 with rounded corners and an inwardly inclined upper edge. Secured, by means of screws 2, to bosses 3 formed on the interior of the shell 1, is a bracket 4 provided with sockets in which are mounted fulcrum bearings 5.

Supported for rocking movement on the fulcrum bearings 5 are knife-edge fulcrum pivots 6 which are fixedly secured to an even arm lever 7. Also fixedly secured to the even arm lever 7 are a pair of commodity supporting pivots 8 and a pair of counterpoise supporting pivots 9. Engaging the commodity supporting pivots 8 are commodity platter spider bearings 10 which are mounted in inverted sockets in a commodity platter spider 11. The commodity platter spider 11 is formed with a loading box 12 and with arms 13 to which is secured a commodity platter 14. Engaging the counterpoise supporting pivots are counterpoise platter spider bearings 15 which are mounted in inverted sockets in a counterpoise platter spider 16. The counterpoise platter spider also is formed with a loading box 17 and arms 18 to which is secured a counterpoise platter 19. The commodity platter and counterpoise platter have skirts which overhang the upper, inwardly inclined edge of the shell 1 to prevent the ingress of dirt.

Downwardly extending stems 20 and 21 project respectively from the bottoms of the loading boxes 12 and 17 and are pivotally connected at their lower ends to the outer ends of check links 22 and 23. The inner ends of the check links 22 and 23 are pivotally connected to the lower ends of downwardly extending bosses 24 and 25 which are adjustably secured, by means of screws 26, to the bracket 4. The check links 22 and 23 are parallel to the lever 7 and serve to maintain the condition of level of the platters 14 and 19.

Secured, by means of screws 27, to lugs 28 formed within the shell 1 is a dashpot 29, and within the dashpot 29 is a plunger 30 having thermostatically controlled ports. The plunger is connected, by means of a plunger rod, to the lever 7, and when the dashpot is supplied with a suitably viscous liquid its resistance to movement of the plunger serves to damp oscillatory movements of the lever 7 and the moving parts connected thereto.

Firmly secured to the flange 3 on the inside of the shell 1 is an inwardly projecting plate 31, the inner end of which supports an upstanding rod 32. Adjustably mounted on the rod 32, and held in place by a setscrew 33, is a clamp 34 which holds the outer race of a ball bearing 35. The inner race of the ball bearing 35 is fixed to a member 36 having a finger upon which a pointer 37 is mounted for endwise adjustment. The pointer 37 extends into juxtaposition to a chart 38 fixed to the upper end of the upstanding rod 32 and marked with "over" and "under" weight indicia.

The member 36 also has a V-shaped side extension 40, to each tip of which the inner coil of a spiral spring 41 is secured by means of a stud 42. Each stud 42 has a reduced, threaded end which passes through an unthreaded hole in the extension 40 and receives a clamping nut 43. The inner coil of the spiral spring 41 is fastened to the stud 42 by means of a headed pin 44, which in turn is held in place by a screw 45 threaded into the end of the stud and engaging a groove in the pin.

The outer coil of each spring 41 has its edges engaged by grooved clamping members 46 and 47 which, by means of screws 48 and 49, can be drawn together to hold firmly the outer ends of the springs, or loosened to permit adjustment. The clamping member 47 has a flange 50 that is secured by a screw 51 to an L-shaped bracket 52 carried by an arm 53 that is integral with the loading box 17 of the counterpoise platter spider 16, the L-shaped bracket being adjustably secured to the arm 53 by screws 54 that pass through slots 55 in the horizontal leg of the L-shaped bracket.

When the counterpoise platter spider 16 is moved downwardly by the weight of a counterpoise, the pointer 37 swings toward the "Under" side of the chart. When the counterpoise platter spider 16 is moved upwardly by an excess of weight on the commodity platter 14, the pointer swings toward the "Over" side of the chart. When the platters are empty or are loaded equally the pointer stands in 0 position. Because of the fact that the movement of the counterpoise platter spider 16 is as great as the movement of the pivots 9 and the fact that this movement is transmitted without diminution to the springs 41, a very slight angular movement of the lever 7 is sufficient to swing the pointer through a comparatively great angle.

The lever 7 is formed at its ends with laterally extending arms 56, to which are secured beam supporting brackets 57 that extend downwardly between the overhanging skirts of the platters 14 and 19 and the upper edge of the shell 1, and thence outwardly to support a notched beam 58. By this arrangement of platter skirts and beam supporting brackets, the necessity of unsightly openings in the shell is avoided. The beam 58 is equipped with a hanging poise 59 which may be shifted from notch to notch to counterbalance all or parts of various loads.

The resistance of the springs may be adjusted separately by loosening the clamping members 46 and 47 and sliding the outer coils through the grooves in the clamping members to increase or decrease the effective length of the springs. By adjusting the position of the outer coils to make the effective length of the springs unequal, the pointer 37 can be made to move farther on the "Over" side of 0 per ounce of overweight than it moves on the "Under" side of 0 per ounce of underweight, or vice versa. By loosening the screws 54 and sliding the L-shaped bracket toward the center of the scale the resistance of the springs can be increased equally, while by sliding the L-shaped bracket away from the center of the scale the resistance of the springs can be decreased equally. The pointer may be brought to proper 0 position by changing the quantity of loading material 60 in one of the loading boxes 12 or 17.

The chart and pointer are housed in a tower 61 having windows 62 through which the chart and the upper end of the pointer are visible, the tower being attached to the shell 1 by screws 63 so that it can be easily removed for access to the mechanism and so that a tower of different form can be substituted.

The mechanism is so constructed as to be without appreciable pendulum effect; hence, the scale will continue to weigh correctly even if its condition of level be changed. For this reason, it is particularly adapted for use under conditions in which it must be moved from place to place. In order to facilitate handling, the upper end of the tower 61 is equipped with a handle 64 which conforms to the contour of the top of the tower and rests upon the top of the tower when not in use. A pair of long screws 65 extend through ears 66 on the inside of the tower and through holes in the top of the tower and are threaded into the handle, the heads of the screws 65 being far enough below the ears 66 to permit the handle to be lifted somewhat away from the top of the tower, as indicated in Figure IX.

To arrange the scale with the indicator facing the ends rather than the sides, the rod 32 and clamp 34, and the parts carried thereby, are arranged in the position in which they are shown in Figure X, so that the pointer 37 swings crosswise of the scale instead of lengthwise. The L-shaped bracket 52 is replaced by an L-shaped bracket 52a and the tower 61 is replaced by a tower 61a in which the windows face toward the ends of the scale instead of toward the sides.

When the scale is to be arranged with the indicator located at the end instead of at the middle, the shell 1 is replaced by a shell 1b having one of its ends extended sufficiently to support the tower 61b, and a plate 31b is mounted in the extended end of the shell 1b, and the chart and pointer are supported by the plate in an arrangement like that employed when the pointer is to be swung crosswise at the center of the scale. The position of the counterpoise platter spider is reversed, so that the arm 53 extends toward the end of the scale and supports the L-shaped bracket 52b in position for connection to the clamping members 46 and 47 that engage the spiral springs. With this arrangement, the spacing at the center of the shell between the platters is enclosed by an arch-shaped cover 61b.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale, in combination, a frame, a lever centrally pivoted on a fixed axis upon said frame, an indicator pivoted on a fixed axis upon said frame above the pivotal axis of said lever, a load support pivoted upon one end of said lever, said load support having an arm extending longitudinally of said lever, a bracket adjustably mounted upon said arm, a pair of spiral springs each having an end adjustably secured to said bracket, and means for securing the other ends of said spiral springs to said indicator.

2. In a weighing scale, in combination, a frame, a lever centrally pivoted on a fixed axis upon said frame, an indicator pivoted on a fixed axis upon said frame, a load support pivoted upon one end of said lever, said load support having an arm extending longitudinally of said lever, a bracket adjustably mounted upon said arm, a pair of spiral springs each having an end adjustably secured to said bracket, and means for securing the other ends of said springs to said indicator.

3. In a weighing scale, in combination, a frame, a lever centrally pivoted on a fixed axis upon said frame, an indicator pivoted on a fixed axis upon said frame, a load support pivoted upon one end of said lever, an arm rigidly fixed to said load support and extending longitudinally of said lever, a pair of spiral springs, means for adjustably securing an end of each of said springs in fixed relation to said arm, and means for securing the other ends of said springs to said indicator.

4. In a weighing scale, in combination, a frame, a lever centrally pivoted on a fixed axis upon said frame, an indicator pivoted on a fixed axis upon said frame, a load support pivoted upon one end of said lever, spring load-counterbalancing means, means for adjustably connecting said spring load-counterbalancing means to said load support, and means for connecting said spring load-counterbalancing means to said indicator, said load support including a platter having a skirt overhanging a portion of said frame, a bracket fixed to said lever and extending between said skirt and a portion of said frame overhung by said skirt, and a beam secured to said bracket.

5. In a weighing scale, in combination, a casing, a lever centrally pivoted within said casing, a pair of load supports pivoted upon the ends of said lever, each of said load supports including a platter having a skirt overhanging a portion of said casing, brackets fixed to said lever and extending downwardly between said skirts and portions of said casing overhung by said skirts, and a beam carried by said brackets, said beam lying exteriorly of said casing.

6. In a weighing scale, in combination, a casing, a lever pivoted within said casing, a load support pivoted upon said lever, said load support including a platter having a skirt overhanging a portion of said casing, a bracket fixed to said lever and extending downwardly between said skirt and a portion of said casing overhung by said skirt, and a beam secured to said bracket, and lying exteriorly of said casing.

MARK A. WECKERLY.